United States Patent [19]

Hiraiwa et al.

[11] Patent Number: 4,466,305
[45] Date of Patent: Aug. 21, 1984

[54] REVERSE IDLER GEAR OPERATING MECHANISM

[75] Inventors: Kazuyoshi Hiraiwa; Yoshiyuki Fukuda, both of Yokohama, Japan

[73] Assignee: Nissan Motor Co., Ltd., Kanagawa, Japan

[21] Appl. No.: 379,509

[22] Filed: May 18, 1982

[30] Foreign Application Priority Data

May 19, 1981 [JP] Japan .................................. 56-74096

[51] Int. Cl.³ ........................ B60K 20/00; F16H 35/00
[52] U.S. Cl. ...................................... 74/473 R; 74/384
[58] Field of Search ...................... 74/473 R, 475, 477, 74/404, 396, 397, 354, 384, 405, 105, 102, 106, 353, 416, 417, 329, 352

[56] References Cited

U.S. PATENT DOCUMENTS

| 684,930 | 10/1901 | Hanauer et al. ........................ 74/477 |
| 801,012 | 10/1905 | Howard .................................. 74/405 |
| 1,033,521 | 7/1912 | Beguelin ................................. 74/475 |
| 1,614,203 | 1/1927 | Ljungstrom .......................... 74/354 |
| 2,100,678 | 11/1937 | Wagner ................................. 74/473 |
| 2,147,027 | 2/1939 | Grier .................................... 74/397 |
| 2,156,581 | 5/1939 | Campbell .............................. 74/396 |
| 2,430,169 | 11/1947 | Grant .................................... 74/354 |
| 2,815,675 | 12/1957 | Strimel ................................. 74/354 |
| 3,943,786 | 3/1976 | Mills ..................................... 74/384 |
| 4,041,422 | 8/1977 | Noji et al. ............................ 74/384 |
| 4,154,144 | 5/1979 | Lyman .................................. 74/405 |

FOREIGN PATENT DOCUMENTS

| 212808 | 1/1958 | Australia .............................. 74/352 |
| 88390 | 4/1960 | Denmark ............................. 74/397 |
| 486048 | 10/1953 | Italy ..................................... 74/352 |
| 561291 | 4/1957 | Italy ..................................... 74/106 |
| 609389 | 9/1948 | United Kingdom ................. 74/359 |
| 2049075 | 12/1980 | United Kingdom ................. 74/416 |

Primary Examiner—Leslie A. Braun
Assistant Examiner—Michael J. Gonet
Attorney, Agent, or Firm—Lowe, King, Price & Becker

[57] ABSTRACT

A reverse idler gear is mounted for rotation but against axial movement on a swingable reverse idler shaft and adapted to be moved into mesh with other gears to reverse the drive line or disengaged from same in response to the ocillatory motion of the reverse idler shaft.

1 Claim, 2 Drawing Figures

REVERSE IDLER GEAR OPERATING MECHANISM

BACKGROUND OF THE INVENTION

1. Field of the Invention

The present invention relates to a reverse idler gear operating mechanism for use in an automobile manual transmission.

2. Description of the Prior Art

A reverse idler gear is used in automobile manual transmissions to reverse the normal direction of rotation of the main or output shaft so that the automobile can be moved backward. The reverse idler gear in a typical manual transmission is mounted for both rotation and axial movement on a stationary shaft so that it can be selectively moved into two operative positions, i.e., a neutral position where disengaged from other gears and a shifted position where engaging the gears to reverse the drive line.

With such sliding reverse idler gear, the transmission is required to have an additional axial length by at least the extent corresponding to the sliding distance of the reverse idler gear between the above two operative positions. Further, the transmission requires additional preventive measures against a transmission slipping out of reverse gear since the sliding reverse idler gear is subject to axial thrust loads and likely to cause the transmission to slip out of reverse gear.

SUMMARY OF THE INVENTION

In accordance with the present invention, there is provided a novel reverse idler gear operating mechanism for use in a motor vehicle manual transmission. The mechanism comprises a reverse idler gear engageable with driving and driven reverse gears to reverse the drive line, and a reverse idler shaft pivotally mounted at one end thereof to a transmission case and having mounted thereon the reverse idler gear for rotation but against axial movement relative thereto. The reverse idler shaft is turnable about the aforementioned one end thereof between a first angular position where it allows the reverse idler gear to engage the driving and driven reverse gears and a second angular position where it allows the former to be disengaged from the latter.

This structure enables the transmission to be compact, particularly with respect to the axial length thereof. Further, this structure enables the transmission to be positively and assuredly prevented from slipping out of reverse gear without requiring additional preventive measures.

It is accordingly an object of the present invention to provide a novel reverse idler gear operating mechanism for use in an automobile manual transmission which enables the transmission to be compact, particularly with respect to the axial length thereof.

It is a further object of the present invention to provide a novel reverse idler gear operating mechanism of the above described character which enables the transmission to be positively and assuredly prevented from slipping out of reverse gear without requiring additional preventive measures.

BRIEF DESCRIPTION OF THE DRAWINGS

The features and advantages of the reverse idler gear operating mechanism according to the present invention will become more clearly appreciated from the following description taken in conjunction with the accompanying drawings, in which.

DESCRIPTION OF THE PREFERRED EMBODIMENT

Figure 1:
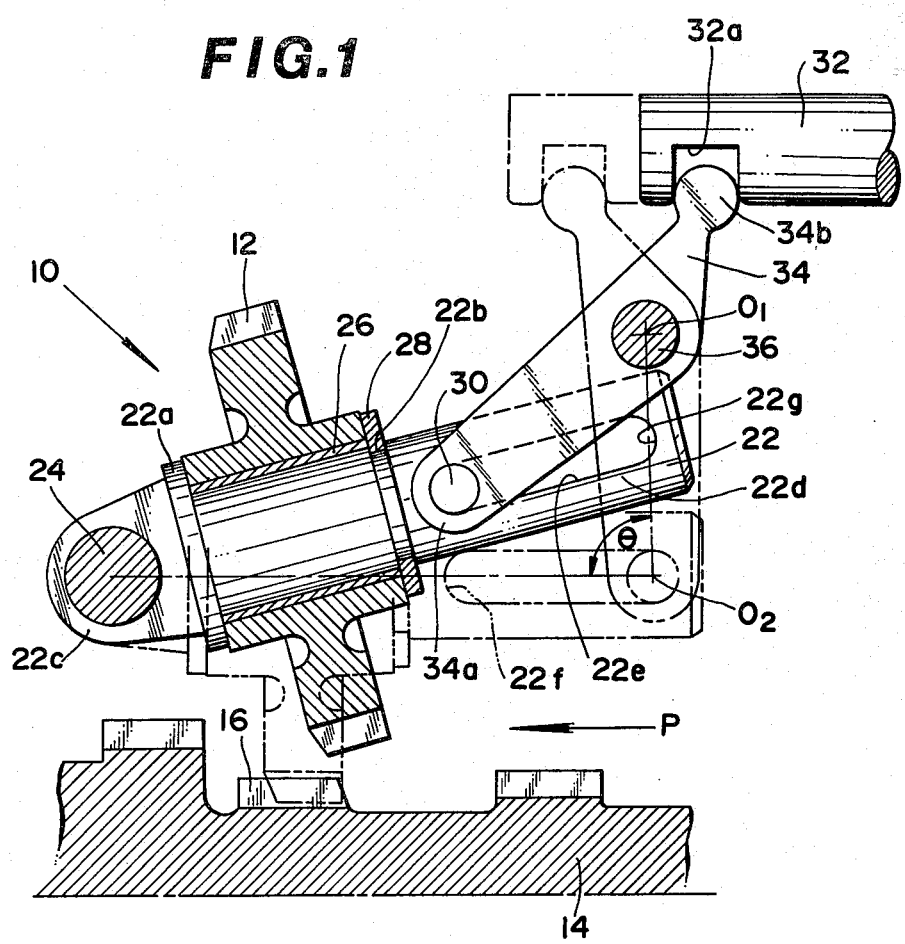
FIG. 1 is a sectional view of a reverse idler gear operating mechanism for use in an automobile manual transmission according to the present invention.
Figure 2:
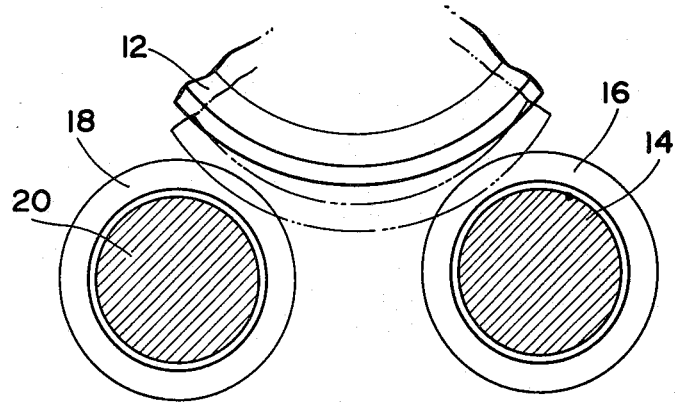
FIG. 2 is a fragmentary elevation taken in the direction following the narrow P in FIG. 1.

Referring now to FIGS. 1 and 2, a reverse idler gear operating mechanism for use in an automobile manual transmission according to the present invention is generally indicated at 10 and shown to comprise a reverse idler gear 12, a mainshaft or output shaft 14, a driven reverse gear 16 integrally formed with the mainshaft 14 and a driving reverse gear 18 mounted on a shaft 20, a counter shaft or a transmission input shaft for instance, parallel with the mainshaft 14.

In accordance with the present invention, the reverse idler gear 12 is mounted for rotation but against axial movement on a reverse idler shaft 22 which is turnable or swingable about a pivot shaft 24. More specifically, the reverse idler gear 12 is rotatably mounted via a bushing 26 on the reverse idler shaft 22 and placed between a flange 22a integrally formed with the reverse idler shaft 22 and a snap ring 28 fitted in an annular groove 22b in the periphery of the reverse idler shaft 22 so that the reverse idler gear 12 is held fixed axially of the reverse idler shaft 22. The reverse idler shaft 22 is pivotally mounted at one end 22c thereof on the pivot shaft 24 extending to cross the mainshaft 14 and the shaft 20 at right angles and fixedly attached to a transmission case (not shown).

The reverse idler shaft 22 has at the other end portion 22d thereof a radial opening 22e which is elongated axially of the shaft 22 and extends radially thoughout the same. Received in the opening 22e is a sliding pin 30 which is slidingly movable between two extreme positions where engaging the longitudinally opposed ends 22f and 22g of the opening 22e. The sliding pin 30 is attached to one end 34a of a bellcrank-shaped shifter 34 whose the other end 334b is received in a notch 32a formed in an axially slidable rod 32. In this instance, the notch 32a is adapted to engage at the opposed side walls thereof with the end 34b of the shifter 34 and not to directly engage at the top wall thereof with the same. The shifter 34 is pivotally mounted at a location intermediate between the ends 34a and 34b thereof on a pivot shaft 36 extending in parallel with the pivot shaft 24 and fixedly attached to the transmission case.

The above described mechanism of the present invention operates as follows.

The reverse idler gear 12 as illustrated in full lines in the neutral position where it is disengaged from the driving and driven reverse gears 18 and 16 so that the mainshaft 14 may not revolve or may revolve in the normal direction. The reverse idler gear 12 is also illustrated in dash and dot lines in the shifted position into which it is moved from the neutral position when a shift lever (not shown) is shifted into the reverse gear selecting position. That is, in response to the shifting of the shift lever into reverse, the rod 32 is cause to move from the position illustrated in full lines into the position illustrated in dash and dot lines. This in turn causes the shifter 34 to rotate counterclockwise about the pivot shaft 36 into the position illustrated in dash and dot lines. During such rotation of the shifter 34, the sliding pin 30 is caused to move from the position where engaging the end 22f of the opening 22e into the position where engaging the end 22g of same, causing the reverse idler shaft 22 to turn about the pivot pin 24 from the position illustrated in full lines where it is incline relative to the shafts 14 and 20 into the position illustrated in dash and dot lines where it extends in parallel with the shafts 14 and 20. When this is the case, the sliding pin 30 is brought into abutting engagement with the end 22g of the opening 22e to prevent the reverse idler shaft 22 to turn further beyond the horizontal position. In the above manner, the shifter 34 imparts oscillatory motion to the reverse idler shaft 22 in response to the axial sliding of the rod 32 and as a consequence the reverse idler gear 12 is moved into the shifted position illustrated in dash and dot lines and brought into mesh with the driving and driven reverse gears 16 and 18 to cause reverse mainshaft rotation so that the automobile can be moved backward.

Thereafter, when the shift lever is shifted from the reverse gear selecting position into the neutral position, the rod 32 is returned from the position illustrated in dash and dot lines to the position illustrated in full lines, causing the shifter 34 to return to the position illustrated in full line. This in turn causes the sliding pin 30 to be moved back into the position where it is abuttingly engaged with the end 22f of the opening 22e. In response to such movement of the sliding pin 30, the reverse idler shaft 22 turns about the pivot shaft 24 and causes the reverse idler shaft 12 to be moved from the shifted position illustrated in dash and dot lines into the neutral position illustrated in full lines. The reverse idler gear 12 is thus disengaged from the driving and driven gears 16 and 18 and does not cause reverse mainshaft rotation.

From the foregoing, it is to be understood that according to the present invention the reverse idler gear is adapted to be selectively moved into the neutral and shifted positions not by moving the reverse idler gear relative to and axially of the reverse idler shaft but by swinging or turning the reverse idler shaft about one end thereof. This structure enables the transmission to be compact, particularly with respect to the axial length thereof. The structure of this invention also provides effective preventive measures against a transmission slipping out of reverse gear since axial thrust loads on the reverse idler gear 12 is transferred to the pivot shaft 24 fixedly attached to the transmission case to be sustained thereby and further since radial thrust loads on the reverse idler gear is transferred to the pivot shaft 36 fixedly attached to the transmission case to be sustained thereby. With the reverse idler gear operating mechanism of this invention, the transmission can therefore be positively and assuredly prevented from slipping out of reverse gear without requiring additional preventive measures. In this connection, the reverse idler gear operating mechanism of the present invention can provide more positive and assured preventive measures against a transmission slipping out of reverse gear when the angle $\theta$ is set to be 90°, where $\theta$ is the angle formed by the center axis of the reverse idler shaft 22 in the shifted position illustrated in full lines and the line interconnecting the center $O_1$ of the pivot shaft 36 and the center $O_2$ of the sliding pin 30 in the state engaging the end 22g of the opening 22.

Obviously, many variations and modifications of the present invention are possible in light of the above teachings. It is, therefore, to be understood that within the scope of the appended claims, the invention may be practiced otherwise than as specifically described.

What is claimed is:

1. A reverse idler gear operating mechanism in an automobile manual transmission comprising:

a driving reverse gear mounted on a shaft for rotation therewith but against axial movement relative thereto;

a driven reverse gear mounted on a mainshaft for rotation therewith but against axial movement relative thereto, said mainshaft being arranged generally parallel to said driving reverse gear shaft;

a reverse idler gear located between said driving and driven reverse gears and engageable therewith to reverse the drive line;

a reverse idler shaft pivotally mounted at one end thereof on a pivot shaft, said pivot shaft extending substantially at right angles to said driving reverse gear shaft and said mainshaft and fixedly attached to a transmission case, said reverse idler shaft being moveable about said pivot shaft between a first angular position where it extends generally parallel to said driving reverse gear shaft and said mainshaft to allow said reverse idler gear to engage the driving and driven reverse gears and a second position where it is inclined relative to said driving reverse gear shaft and said mainshaft to allow the former to be disengaged from the latter;

said reverse idler shaft having at the other end portion thereof an axially elongated opening;

a shifter pivotally mounted at a location intermediate opposed first and second ends thereof on a pivot shaft which extends in parallel with the first-mentioned pivot shaft and fixedly attached to the transmission case, said shifter having at said first end a sliding pin slidably received in said elongated opening; and an axially slidable rod having a notch with which said second end of said shifter is engaged.

* * * * *